United States Patent [19]
Holzbaur

[11] 4,064,843
[45] Dec. 27, 1977

[54] FUEL METERING AND INJECTION SYSTEM FOR INTERNAL COMBUSTION ENGINES

[75] Inventor: Siegfried Holzbaur, Stuttgart, Germany

[73] Assignee: Robert Bosch GmbH, Stuttgart, Germany

[21] Appl. No.: 727,702

[22] Filed: Sept. 29, 1976

[30] Foreign Application Priority Data

Sept. 30, 1975  Germany ............................ 2543562

[51] Int. Cl.² ............................................. F02B 3/12
[52] U.S. Cl. ........................ 123/32 EJ; 123/119 R; 123/139 BG; 123/139 AW; 123/139 AT; 123/139 BC; 261/44 A; 261/44 R
[58] Field of Search ............... 261/44 A, 44 R, 50 A, 261/62; 123/119 R, 139 BG, 139 AW, 32 EJ, 139 AT, 139 BC

[56] References Cited

U.S. PATENT DOCUMENTS

| 110,651 | 11/1917 | Billon-Grand | 261/44 A |
| 1,555,489 | 9/1925 | Spencer et al. | 261/44 R |
| 3,711,068 | 1/1973 | Perry | 261/44 A |
| 3,777,725 | 12/1973 | Stumpp et al. | 123/119 R |
| 3,880,125 | 4/1975 | Kammerer et al. | 123/32 EJ |

*Primary Examiner*—Charles J. Myhre
*Assistant Examiner*—R. Nelli
*Attorney, Agent, or Firm*—Edwin E. Greigg

[57] ABSTRACT

A fuel preparation system for an internal combustion engine employs an induction tube air flap which is shaped so as to be subject to aerodynamic lift forces when the air flow has caused a substantial displacement of the flap. In addition, the wall of the induction tube is made inwardly movable so that the net cross section available to the air flow may be reduced and a proportionately greater deflection rate obtained. The fuel quantity, which is related to the angular deflection is thus increased, causing a richer mixture. The air flap has internal channels which carry fuel from the pivotal shaft to the induction tube for injection into the air stream.

13 Claims, 4 Drawing Figures

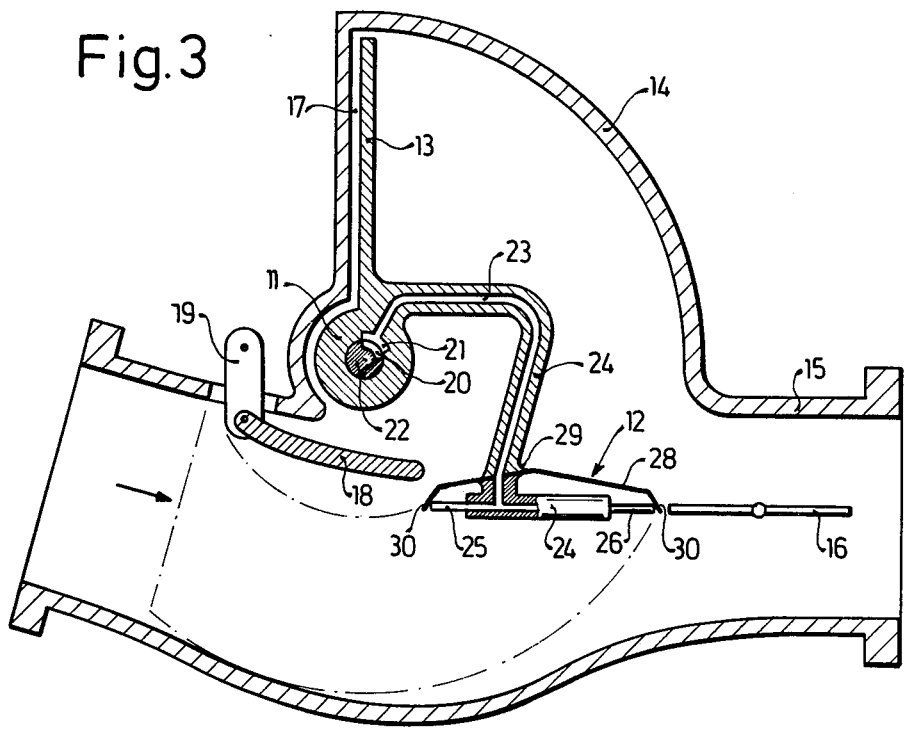
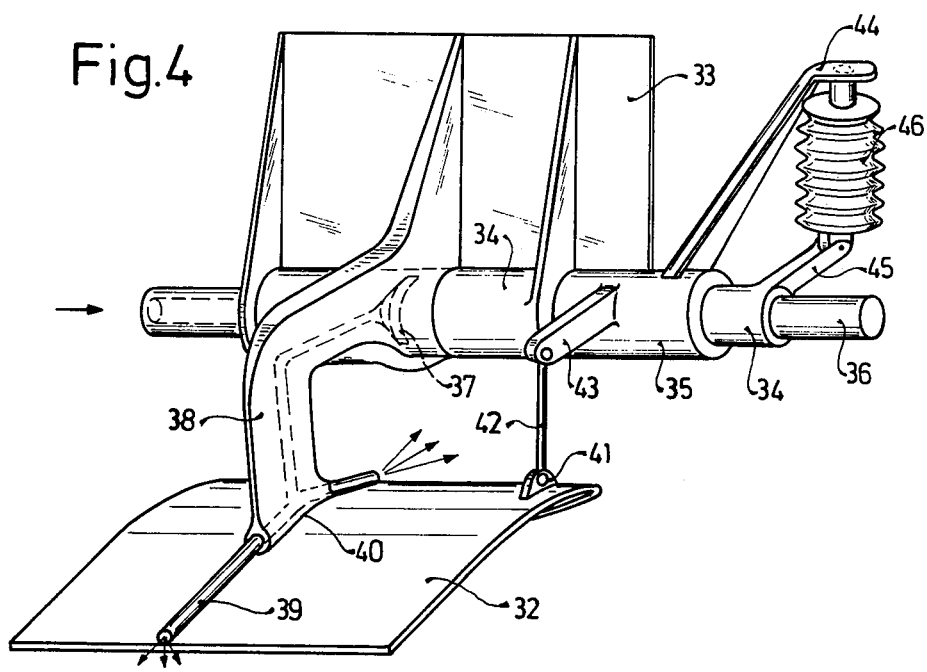

FUEL METERING AND INJECTION SYSTEM FOR INTERNAL COMBUSTION ENGINES

BACKGROUND OF THE INVENTION

The invention relates to a fuel injection system for internal combustion engines. It includes an air flow meter device in which a pivotal flap is disposed in the induction tube and moves in reaction to the air flow through the induction tube. A restoring force is exerted against the flap in the opposite direction. The degree of rotation of the flap is a measure of the air flow rate. The invention particularly relates to apparatus of the type in which, for low air flow rates, the flap operates essentially in dependence of the pressure differential across the flap, while, during the transition to larger air flow rates, at least a portion of the flap also acts as an air foil where that portion of the flap experiences air flow on both sides and thus is subject to a lifting force and a corresponding torque around its pivotal axis.

In known injection systems which operate with an air measuring flap, the measurement is subject to an error which is commonly referred to as an averaging error and is caused by the fact that the average of the air pressure fluctuations due to the engine operation causes the air flap to be displaced further than would be the case without such pulsations, i.e., corresponding to the actually aspirated air quantity. Furthermore, in these known systems it is relatively difficult and expensive to make allowance for particular parameters which should affect the fuel-air ratio (the value of $\lambda$). In all known systems, the preparation of the fuel-air mixture also constitutes a serious difficulty.

OBJECT AND SUMMARY OF THE INVENTION

It is a principal object of the invention to provide a fuel injection system of the type described above which is improved to reduce or eliminate the above-explained averaging error with a minimum of expense. It is a further object of the invention to improve the known fuel injection system to permit a simple influence of the $\lambda$-control and to provide a substantial improvement in the preparation of the fuel-air mixture.

These and other objects are attained according to the invention by providing that the pivoting flap is disposed parallel to but distant from its pivotal axis so that a plane which is substantially defined by the surface of the flap is parallel to but external to the pivotal axis. The invention further provides that the connection between the flap and the pivotal axis is made by a bridge which offers relatively little resistance to the air flow.

In an advantageous feature of the invention, portions of the induction tube wall are made movable so that the flow cross section presented to the air as between the induction tube wall and the air flap is increased for increasing air flow rate.

The invention will be better understood as well as further objects and advantages thereof become more apparent from the ensuing detailed description of three exemplary embodiments taken in conjunction with the drawing.

BRIEF DESCRIPTION OF THE DRAWING

FIG. 3 is a diagram of a second embodiment of the invention including a damper flap; and FIG. 4 is an illustration of a third exemplary embodiment permitting relative displacement of the air flap and its pivotal axis.

DESCRIPTION OF THE PREFERRED EMBODIMENTS

Figure 1:
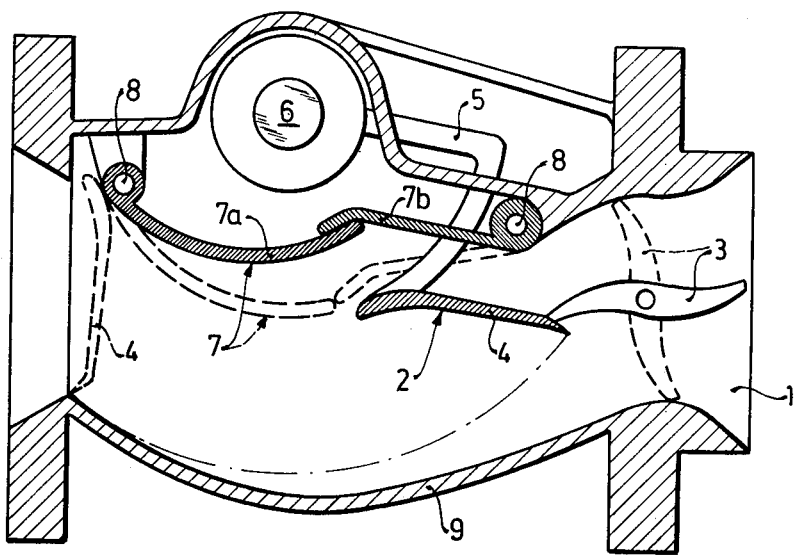
FIG. 1 is a cross-sectional diagram through a first embodiment of the invention.
Figure 2:
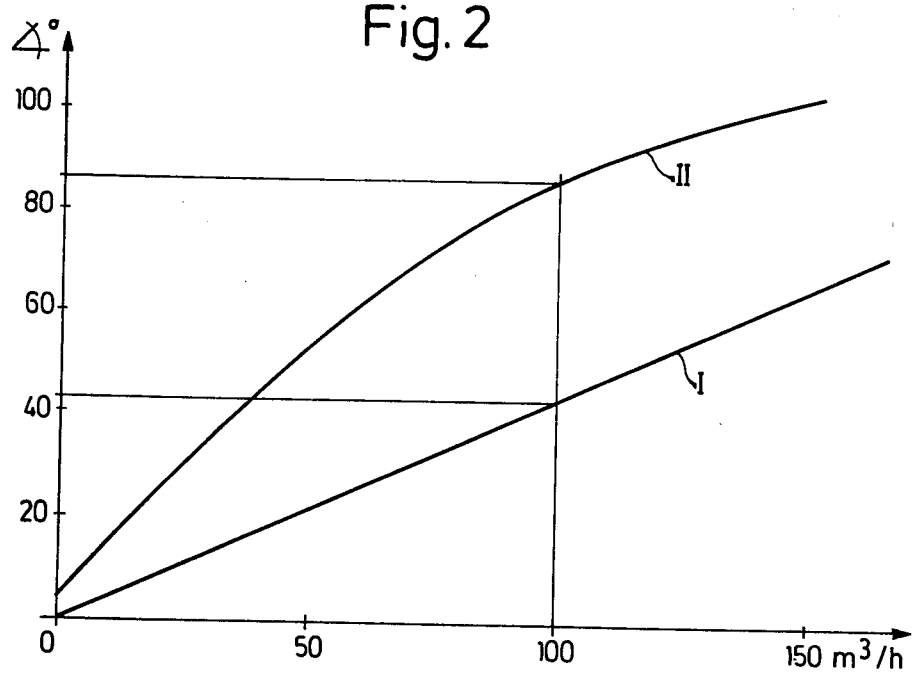
FIG. 2 is a diagram illustrating the angular displacement of the air flap as a function of the air flow rate.

Turning now to FIG. 1, there is illustrated an induction tube region 1 which includes an air flow rate meter 2 and a throttle valve 3. The air flow rate meter 2 has a flap 4 which is exposed to the air aspirated by the engine and which is connected by a bridge 5 to a pivotal shaft 6. The degree of rotation of the pivotal shaft 6 is used as a parameter for determining the amount of fuel metered out to the engine. The fuel injection process itself may take place at some location in the vicinity of the metering, for example at the air flap 4, or in some location in the induction tube or adjacent to the inlet valves of the engine.

When the air flap 4 occupies the position shown in broken lines in FIG. 1, it substantially obturates the entire air passage and thus acts as a baffle plate operating by the laws of the resistance principles, whereas, when the air flow rate increases due to the position of the throttle valve 3 and/or the engine rpm, the flap 4 may be displaced up to its nearly horizontal position shown in solid lines. In this position, which corresponds to a maximum air flow rate, the flap 4 is subject to lift due to its action as an air foil. Air flows around the flap 4 on both sides and it is desirable if the bridge 5 has an aerodynamic profile so as to present a minimum resistance to the air flow.

The degree of displacement of the flap 4 and hence the amount of metered out fuel also depends on the flow cross section defined by the flap 4 on the one hand and the induction tube wall on the other hand. The induction tube wall is so shaped that the flow cross section changes linearly with the pivotal motion of the flap 4, i.e., the fuel quantity increases linearly with the air flow rate. However, it may be desirable, for example, to enrich the fuel-air mixture by admitting more fuel at some particular value of the air flow rate; for this purpose the flow cross section must be reduced so that, for the same air flow rate, the flap experiences a greater displacement and thus more fuel may be metered out through the shaft 6. This object is attained by a substantially lateral displacement of a wall portion 7 of the induction tube lying between the flap 4 and the pivotal shaft 6 in the direction of the flap 4. For this purpose, the wall may be divided into two pivotal regions 7a and 7b or it may be embodied as a single member pivoting about an appropriate axis. For example, if, as shown, the wall 7 assumes the position shown in dashed lines, the flow cross section available to the air flow is that between the flap 4 and the opposite induction tube wall 9. If, for example, that cross section is chosen to be half as great as the previously available flow cross section, then the quantity of fuel provided for a given air flow rate would be twice as large. It would be entirely suitable to make the wall 9 movable instead of, or in addition to, the wall portion 7. The displacement of the wall members 7a, 7b on their shafts 8 may take place in dependence on air pressure, on engine temperature, or some other parameter, for example the exhaust gas composition, in any suitable manner not further illustrated.

The operation of the apparatus according to the invention will be better understood by reference to FIG.

2 which is a diagram showing the degree of angular deflection of the flap 4 or the shaft 6 as a function of the air flow rate in cubic meters per hour.

The amount of fuel delivered to the engine is normally proportional to the angular deflection shown in the ordinate of the curve. The curve labeled I corresponds to the normal operation which poses a linear relation between the air flow rate and the fuel quantity. The curve labeled II corresponds to a displacement of the lateral induction tube wall resulting in an enrichment of the fuel-air mixture. In the example shown, at an air flow rate of 100 cubic meters per hour, the shaft is rotated by 43° from its quiescent position. However, if the induction tube wall is displaced inwardly, the same air flow rate will displace the shaft by 86° as shown in curve II, i.e., the amount of fuel is doubled. Such an extreme adjustment would be required only during warm-up operation but the entire region between the curves I and II is available, in principle, for any desired change of the fuel-air mixture. The curve II could also be a straight line so that the enrichment takes place in a multiplicative manner but it may have any desired behavior, by suitable displacement of the side walls of the induction tube, so as to permit any desired adaptation of the fuel-air mixture to the air flow rate.

The second embodiment of the invention illustrated in FIG. 3 includes a damper plate 13 affixed to the bushing 11 which also carries the air flap 12. The damper plate moves with small clearance in a housing portion 14 of the induction tube region 15 which also includes the air flap 12 and a throttle valve 16. The damper 13 damps the motions of the air flap 12 because it continually displaces air from or to the chamber 17 through the small slit which obtains between the edge of the damper 13 and the housing 14.

A further plate 18, whose position is adjustable by means of a lever 19, alters the air flow cross section obtaining between the air flap 12 and the induction tube wall so that the fuel-air mixture ratio may be changed as in the first exemplary embodiment by motion of the wall portion 7.

Fuel supply takes place by overlapping annular grooves 20, 21 which define a fuel flow cross section which is proportional to the relative angle of rotation. The annular groove 20 is disposed on a fixed shaft 22 which carries the bushing 11 while the annular groove 21 is disposed in an inner bore of the bushing 11. In this exemplary embodiment, fuel is injected from the vicinity of the air flap 12. For this purpose, there is provided a channel 23 which connects the metering grooves 20, 21 with injection nozzles 25 and 26 which spray fuel in opposite directions, i.e., in the position shown, with and against the direction of the air flow, respectively.

The air flap 12 is loaded in the direction opposite the air flow by means, not shown, for example a spiral spring which may engage the bushing 11.

The actual air flap is an elastic thin plate 28, made, for example, from spring steel foil, which is clamped on the bridge 24 at a point 29, if necessary under tension. The edges 30 of the plate are bent which causes them to exert a greater influence on the air flow. The effluent from nozzles 25 and 26 is aimed at the bent portions 30 of the flap 12 so that the fuel is widely dispersed and well distributed and enters the air flow in the manner of a film. The resiliency of the plate 28 causes the above referred-to averaging error to be partially compensated for because pulsations of the air flow rate cause the plate to yield and thus to absorb part of the motion, thereby reducing the measuring error.

A third embodiment of the invention is illustrated in the perspective view of FIG. 4 and shows an air flap 32 and a damper plate 33 mounted on a common bushing 34. The bushing 34 has two different radii as shown and the smaller radius carries a sleeve 35. The bushing 34 is mounted on a shaft 36 with which it cooperates to form the fuel metering location 37. The bridge 38 connecting the air flow flap and the damper 33 is provided with tubes 39 which may serve as fuel injection nozzles. At the location 40, the flap pivots, while at a point 41, a rod 42 and a lever 43 connects the flap with the sleeve 35. When the sleeve 35 is rotated on the bushing 34, the flap 32 will be rotated relative to the bridge 38 around the bearing location 40. A pressure cell 46 is connected as shown by levers 44 and 45 with the sleeve 35 and the bushing 34, respectively. Thus, depending on the air pressure within the pressure cell 46, the flap 32 is displaced with respect to its pivotal bushing 34 and this displacement causes a change in the fuel-air ratio. For, depending on the position of the flap 32 relative to the pivotal bushing 34, the aerodynamic lift experienced by the flap due to the air flow is changed, thus the relative relationship between the air flow rate and the pivotal motion of the bushing 34 is altered and causes a change in the metered out fuel quantity and hence in the fuel-air ratio.

In all the exemplary embodiments, the invention provides a possibility for changing the fuel-air mixture as well as good preparation and atomization of the fuel-air mixture while maintaining a very favorable and economical construction and solves the previously unsolved problem of reducing the averaging error.

The foregoing relates to preferred embodiments of the invention, it being understood that other embodiments and variants thereof are possible within the spirit and scope of the invention, the latter being defined by the appended claims.

What is claimed is:

1. In a fuel injection system for internal combustion engines, said system including air flow metering means having a pivotable air flap disposed in the induction tube of the engine, said air flap being pivoted by the forces due to differences of pressure upstream and downstream thereof when the air flow is small and being pivoted by forces due to aerodynamic lift when the air flow is greater, the improvement comprising:
   mounting said air flap on a pivotable shaft by means of a connecting bridge which has a flow profile offering substantially minimum resistance to the air flow and in such a manner that the surface defined by said air flap is substantially parallel to and external to said shaft.

2. A fuel injection system as defined by claim 1, wherein said connecting bridge has at least one longitudinal internal bore and where there is provided on said air flap at least one fuel nozzle communicating with said internal bore: whereby fuel may be delivered from the interior of said pivotal shaft to said nozzle.

3. A fuel injection system as defined by claim 2, wherein said air flap is provided with at least two fuel nozzles for spraying fuel in opposite directions so disposed that when said air flap is in a position to fully open the induction tube of the engine, the directions of fuel flow from said nozzles are respectively in the direction of air flow and opposite to the direction of air flow.

4. A fuel injection system as defined by claim 2, wherein said flap has a bent-over edge and wherein said at least one nozzle is directed to squirt fuel against said bent-over edge for improved fuel dispersion.

5. A fuel injection system as defined by claim 1, wherein said induction tube defines a housing and wherein said pivotal axis is further provided with a damper plate moving in said housing and wherein the walls of said housing substantially correspond to the path traced by the edges of said damper plate during its motion.

6. A fuel injection system as defined by claim 1, wherein at least a terminal portion of said air flap located in the downstream side of that air flap, when open, is constructed from an elastic material which yields in the direction of air flow and in the direction normal thereto.

7. A fuel injection system as defined by claim 6, wherein the elastic end region of said air flap is bent parallel to the pivotal axis for providing additional aerodynamic lift.

8. A fuel injection system as defined by claim 6, wherein said elastic region of said air flap is clamped under tension to associated carrier portions on said connecting bridge.

9. A fuel injection system as defined by claim 8, wherein said carrier portions are two sculptured members for clamping the elastic region of said air flap and for defining between them a fuel channel and slits for fuel flow therethrough in the manner of nozzles.

10. A fuel injection system as defined by claim 1, wherein portions of the induction tube wall adjacent said air flap are movable, whereby the total air flow cross section through said induction tube at the location of said air flap may be altered.

11. A fuel injection system as defined by claim 10, wherein said movable induction tube wall is pivotable about an axis so located that when said air flap is in its initial position said pivotable axis for said induction tube wall is located immediately adjacent the leading edge of said air flap, whereby, when said air flap is pivoted, the free flow cross section through the induction tube changes in multiplicative manner.

12. A fuel injection system as defined by claim 1, wherein the relative position of said air flap with respect to said pivotal axis may be changed.

13. A fuel injection system as defined by claim 12, wherein said pivotal shaft includes portions of differing diameter and further comprising a fixed rod on which pivots said pivotal shaft and further including a sleeve pivotably mounted on said pivotal shaft, said pivotal shaft being fixedly attached to said connecting bridge and said sleeve being movably attached to said air flap.

* * * * *